United States Patent
Ehlmann et al.

(10) Patent No.: US 10,050,446 B2
(45) Date of Patent: Aug. 14, 2018

(54) DEVICE AND METHOD FOR GLOBAL MAXIMUM POWER POINT TRACKING

(71) Applicant: SunPower Corporation, San Jose, CA (US)

(72) Inventors: Jonathan Ehlmann, Austin, TX (US); Daniel Blair, Austin, TX (US); Eric Martina, Houston, TX (US); Patrick Chapman, Austin, TX (US); Brian Kuhn, Austin, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 15/796,228

(22) Filed: Oct. 27, 2017

(65) Prior Publication Data
US 2018/0054066 A1 Feb. 22, 2018

Related U.S. Application Data

(63) Continuation of application No. 15/273,235, filed on Sep. 22, 2016, now abandoned, which is a (Continued)

(51) Int. Cl.
G05F 1/67 (2006.01)
H02J 3/38 (2006.01)
(Continued)

(52) U.S. Cl.
CPC ............... *H02J 3/385* (2013.01); *G05F 1/67* (2013.01); *H02M 7/44* (2013.01); *H02M 7/48* (2013.01);
(Continued)

(58) Field of Classification Search
CPC ............ H02J 3/385; H02M 7/48; H02M 7/44; H02M 2001/007; G05F 1/67; Y02E 10/58
(Continued)

(56) References Cited

U.S. PATENT DOCUMENTS

| | | | |
|---|---|---|---|
| 3,670,230 A | 6/1972 | Rooney et al. |
| 4,114,048 A | 9/1978 | Hull |

(Continued)

FOREIGN PATENT DOCUMENTS

| | | |
|---|---|---|
| CA | 2353422 C | 3/2004 |
| CA | 2655007 A1 | 8/2010 |

(Continued)

OTHER PUBLICATIONS

Ando et al., "Development of Single Phase UPS Having AC Chopper and Active Filter Ability," IEEE International Conference on Industrial Technology, 10.1109/ICIT.2006.372445, pp. 1498-1503, 2006.

(Continued)

*Primary Examiner* — Rajnikant Patel
(74) *Attorney, Agent, or Firm* — Grasso PLLC

(57) ABSTRACT

A device, system, and method for global maximum power point tracking comprises monitoring an output power of a DC power source while executing a maximum power point tracking algorithm and adjusting a maximum power point tracking command signal in response to the output power being less than a reference output power. The command signal is adjusted until the output power exceeds a previous output power by a reference amount. The command signal may be a voltage command signal, a current command signal, an impedance command signal, a duty ratio command signal, or the like.

20 Claims, 9 Drawing Sheets

Related U.S. Application Data continuation of application No. 14/552,131, filed on Nov. 24, 2014, now Pat. No. 9,477,247, which is a continuation of application No. 13/324,027, filed on Dec. 13, 2011, now Pat. No. 8,922,185.

(60) Provisional application No. 61/506,602, filed on Jul. 11, 2011.

(51) Int. Cl.
*H02M 7/44* (2006.01)
*H02M 7/48* (2007.01)
*H02M 1/00* (2006.01)

(52) U.S. Cl.
CPC ........ *H02M 2001/007* (2013.01); *Y02E 10/58* (2013.01)

(58) Field of Classification Search
USPC ........ 323/266–268, 274, 280–290, 299, 906, 323/907; 363/16–17, 34, 37, 39, 89, 95, 363/97, 132; 307/26, 46, 64, 82
See application file for complete search history.

(56) References Cited

U.S. PATENT DOCUMENTS

| | | |
|---|---|---|
| 4,217,633 A | 8/1980 | Evans |
| 4,277,692 A | 7/1981 | Small |
| 4,287,465 A | 9/1981 | Godard et al. |
| 4,649,334 A | 3/1987 | Nakajima |
| 4,651,265 A | 3/1987 | Stacey et al. |
| 4,661,758 A | 4/1987 | Whittaker |
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |
| 5,148,043 A | 9/1992 | Hirata et al. |
| 5,160,851 A | 11/1992 | McAndrews |
| 5,191,519 A | 3/1993 | Kawakami |
| 5,309,073 A | 5/1994 | Kaneko et al. |
| 5,343,380 A | 8/1994 | Champlin |
| 5,473,528 A | 12/1995 | Hirata |
| 5,668,464 A | 9/1997 | Krein |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,838,148 A | 8/1998 | Kurokami |
| 5,801,519 A | 9/1998 | Midya et al. |
| 5,268,832 A | 12/1998 | Kandatsu |
| 5,886,890 A | 3/1999 | Ishida et al. |
| 5,892,354 A * | 4/1999 | Nagao ..................... G05F 1/67 323/299 |
| 5,929,537 A | 7/1999 | Glennon |
| 5,978,236 A | 11/1999 | Fabemian et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 | 8/2006 | Cutler |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen et al. |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,560,902 B2 | 7/2009 | Unger |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,656,690 B2 | 2/2010 | Yamada |
| 7,660,139 B2 | 2/2010 | Garabandic |
| 7,667,610 B2 | 2/2010 | Thompson |
| 7,681,090 B2 | 3/2010 | Kimball et al. |
| 7,710,752 B2 | 5/2010 | West |
| 7,733,679 B2 | 6/2010 | Luger et al. |
| 7,768,155 B2 | 8/2010 | Fornage |
| 7,796,412 B2 | 9/2010 | Fornage |
| RE41,965 E | 11/2010 | West |
| 7,839,022 B2 | 11/2010 | Wolfs |
| 7,839,025 B2 | 11/2010 | Besser |
| 7,855,906 B2 | 12/2010 | Klodowski et al. |
| RE42,039 E | 1/2011 | West et al. |
| 7,899,632 B2 | 3/2011 | Fornage et al. |
| 7,916,505 B2 | 3/2011 | Fornage |
| 7,986,122 B2 | 7/2011 | Fornage et al. |
| 8,154,315 B2 | 4/2012 | Henson et al. |
| 8,159,843 B2 | 4/2012 | Lund et al. |
| 8,482,153 B2 * | 7/2013 | Ledenev ............... H02J 3/385 307/63 |
| 8,611,107 B2 * | 12/2013 | Chapman .......... H02M 3/33523 323/906 |
| 8,693,228 B2 | 4/2014 | Matan |
| 8,922,185 B2 | 12/2014 | Ehlmann |
| 9,088,178 B2 * | 7/2015 | Adest ..................... H02J 1/102 |
| 2001/0043050 A1 | 11/2001 | Fisher, Jr. |
| 2002/0017822 A1 | 2/2002 | Umemura et al. |
| 2002/0196026 A1 | 12/2002 | Kimura et al. |
| 2005/0213272 A1 | 9/2005 | Kobayashi |
| 2006/0067137 A1 | 3/2006 | Udrea et al. |
| 2006/0083039 A1 | 4/2006 | Oliveira et al. |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |

(56) References Cited

U.S. PATENT DOCUMENTS

| | | |
|---|---|---|
| 2008/0183338 A1 | 7/2008 | Kimball et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |
| 2009/0296348 A1 | 12/2009 | Russell et al. |
| 2010/0085035 A1 | 4/2010 | Fornage |
| 2010/0088052 A1 | 4/2010 | Yin et al. |
| 2010/0091532 A1 | 4/2010 | Fornage |
| 2010/0106438 A1 | 4/2010 | Fornage |
| 2010/0139945 A1 | 6/2010 | Dargatz |
| 2010/0175338 A1 | 7/2010 | Garcia Cors |
| 2010/0176771 A1 | 7/2010 | Fieldhouse et al. |
| 2010/0181830 A1 | 7/2010 | Fornage et al. |
| 2010/0195357 A1 | 8/2010 | Fornage et al. |
| 2010/0214808 A1 | 8/2010 | Rodriguez |
| 2010/0222933 A1 | 9/2010 | Smith et al. |
| 2010/0236612 A1 | 9/2010 | Khajehoddin et al. |
| 2010/0263704 A1 | 10/2010 | Fornage et al. |
| 2010/0283325 A1 | 11/2010 | Marcianesi et al. |
| 2010/0309695 A1 | 12/2010 | Fornage |
| 2011/0012429 A1 | 1/2011 | Fornage |
| 2011/0019444 A1 | 1/2011 | Dargatz et al. |
| 2011/0026281 A1 | 2/2011 | Chapman et al. |
| 2011/0026282 A1 | 2/2011 | Chapman et al. |
| 2011/0043160 A1 | 2/2011 | Serban |
| 2011/0049990 A1 | 3/2011 | Amaratunga et al. |
| 2011/0051820 A1 | 3/2011 | Fornage |
| 2011/0130889 A1 | 6/2011 | Khajehoddin et al. |
| 2012/0280673 A1* | 11/2012 | Watanabe ............ H02J 3/1885 323/304 |

FOREIGN PATENT DOCUMENTS

| | | |
|---|---|---|
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | WO 2004008619 A2 | 1/2004 |
| WO | WO 2004100348 A1 | 11/2004 |
| WO | WO 2004100348 A8 | 12/2005 |
| WO | WO 2006048688 A1 | 5/2006 |
| WO | WO 2007080429 A2 | 7/2007 |
| WO | WO 2009081205 A2 | 7/2009 |
| WO | WO 2009081205 A3 | 10/2009 |
| WO | WO 2009134756 A1 | 11/2009 |

OTHER PUBLICATIONS

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com. Apr. 2011, last accessed Aug. 30, 2011 at http://www.electronicsweekly.com/Articles/2011/04/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved 2kw Solar Inverter With Wide Input Voltage Range," IEEE 10th Mediterranean Conference, MEIeCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase Isolated Converter using a DC Active Filter with a Center

(56) References Cited

OTHER PUBLICATIONS

Tap," Twenty-Fourth Annual IEEE Applied Power Electronics Conference and Exposition, APEC '09, pp. 1813-1818, 2009.
Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.
Jeong et al., "An Improved Method for Anti-Islanding by Reactive Power Control," pp. 965-970, 2005.
Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.
Jung et al., "High-frequency DC Link Inverter for Grid-Connected Photovoltaic System," Conference Record of the Twenty-Ninth IEEE Photovoltaic Specialists Conference, pp. 1410-1413, 2002.
Kern, "SunSine300: Manufacture of an AC Photovoltaic Module, Final Report, Phases I & II, Jul. 25, 1995-Jun. 30, 1998," NREL/SR-520-26085, 1999, 32 pages.
Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.
Khajehoddin et al., "A Novel Topology and Control Strategy for Maximum Power Point Trackers and Multi-string Grid-connected PV Inverters," Applied Power Electronics Conference, APEC08, pp. 173-178, 2008.
Khajehoddin et al., "A Robust Power Decoupler and Maximum Power Point Tracker Topology for a Grid-Connected Photovoltaic System," IEEE Power Electronics Specialists Conference, PESC08, pp. 66-69, 2008.
Kim et al., "New Control Scheme for AC-DC-AC Converter Without DC Link Electrolytic Capacitor," 24th Annual IEEE Power Electronics Specialists Conference, PESC '93 Record., pp. 300-306, 1993.
Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.
Kjaer et al., "A Novel Single-Stage Inverter for the AC-module with Reduced Low-Frequency Ripple Penetration," EPE 2003, ISBN 90-75815-07-7, 10 pages, 2003.
Kjaer et al., "A Review of Single-phase Grid-connected Inverters for Photovoltaic Modules," IEEE Trans on Power Electronics, vol. 41, No. 5, pp. 1292-1306, 2005.
Kjaer et al., "Design Optimization of a Single Phase Inverter for Photovoltaic Applications," IEEE 34th Annual Power Electronics Specialist Conference, PESC '03, vol. 3, pp. 1183-1190, 2003.
Kjaer et al., "Power Inverter Topologies for Photovoltaic Modules—A Review," Conf. record of the 37th Industry Applications Conference, vol. 2, pp. 782-788, 2002.
Kjaer, "Design and Control of an Inverter for Photovoltaic Applications," PhD Thesis, Aalborg University Institute of Energy Technology, 236 pages, 2005.
Kjaer, "Selection of Topologies for the PHOTOENERGY™ Project," Aalborg University Institute of Energy Technology, 37 pages, 2002.
Kotsopoulos et al., "A Predictive Control Scheme for DC Voltage and AC Current in Grid-Connected Photovoltaic Inverters with Minimum Dc Link Capacitance," The 27th Annual Conference of the IEEE Industrial Electronics Society, vol. 3, pp. 1994-1999, 2001.
Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.
Kutkut, "PV Energy Conversion and System Integration," Florida Energy Systems Consortium, 2009, 24 pages.

Kwon et al., "High-efficiency Module-integrated Photovoltaic Power Conditioning System," IET Power Electronics, doi: 10.1049/iet-pel. 2008.0023, 2008.
Lohner et al., "A New Panel-integratable Inverter Concept for Grid-Connected Photovoltaic Systems," IEEE ISIE '96, vol. 2, pp. 827-831, 1996.
Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.
Martins et al., "Interconnection of a Photovoltaic Panels Array to a Single-Phase Utility Line From a Static Conversion System," Proc. IEEE Power Electronics Specialists Conf., pp. 1207-1211, 2000.
Martins et al., "Usage of the Solar Energy from the Photovoltaic Panels for the Generation of Electrical Energy," The 21st International Telecommunication Energy Conference, 6 pages, 1999.
Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.
Meinhardt et al., "Miniaturised 'low profile' Module Integrated Converter for Photovoltaic Applications with Integrated Magnetic Components," IEEE APEC '99, vol. 1, pp. 305-311, 1999.
Meza et al., "Boost-Buck Inverter Variable Structure Control for Grid-Connected Photovoltaic Systems," IEEE International Symposium on Circuits and Systems, vol. 2, pp. 1318-1321, 2005.
Midya et al., "Dual Switched Mode Power Converter," 15th Annual Conference of IEEE Industrial Electronics Society, vol. 1, pp. 155-158, Mar. 1989.
Midya et al., "Sensorless Current Mode Control—An Observer-Based Technique for DC-DC Converters," IEEE Transactions on Power Electronics, vol. 16, No. 4, pp. 522-526, Jul. 2001.
Nikraz et al., "Digital Control of a Voltage Source Inverter in Photovoltaic Applications," 35th Annual IEEE Power Electronics Specialists Conference, pp. 3266-3271, 2004.
Oldenkamp et al., "AC Modules: Past, Present and Future, Workshop Installing the Solar Solution," Jan. 1998, Hatfield, UK, 6 pages.
Pajic et al., "Unity Power Factor Compensation for Burst Modulated Loads," IEEE Power Engineering Society General Meeting, vol. 2, pp. 1274-1277, 2003.
Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.
Rodriguez et al., "Analytic Solution to the Photovoltaic Maximum Power Point Problem," IEEE Transactions on Circuits and Systems, vol. 54, No. 9, pp. 2054-2060, Sep. 2007.
Rodriguez et al., "Dynamic Stability of Grid-Connected Photovoltaic Systems," Power Engineering Society General Meeting, vol. 2, pp. 2193-2199, 2004.
Rodriguez et al., "Long-Lifetime Power Inverter for Photovoltaic AC Modules," IEEE Transaction on Industrial Electronics, vol. 55, No. 7, pp. 2593-2601, Jul. 2008.
Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.
Russell et al., "SunSine300 AC Module, Annual Report Jul. 25, 1995-Dec. 31, 1996," NREL/SR-520-23432, UC Category 1280, 1997, 31 pages.
Schmidt et al., "Control of an Optimized Converter for Modular Solar Power Generation," 20th International Conference on Industrial Electronics, Control and Instrumentation, vol. 1, pp. 479-484, 1994.
Schutten et al., "Characteristics of Load Resonant Converters Operated in a High-Power Factor Mode," IEEE, Trans. Power Electronics, vol. 7, No. 2, pp. 5-16, 1991.
Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.

(56) References Cited

OTHER PUBLICATIONS

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PV Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l Conf. Power Electronics, vol. 1, pp. 559-564, 1996.

Takahashi et al., "Electrolytic Capacitor-Less PWM Inverter", in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1Φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1Φ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

\* cited by examiner

US 10,050,446 B2

DEVICE AND METHOD FOR GLOBAL MAXIMUM POWER POINT TRACKING

CROSS-REFERENCE TO RELATED U.S. PATENT APPLICATION

The present application is a continuation application of commonly-owned and co-pending U.S. application Ser. No. 15/273,235, entitled Device And Method For Global Maximum Power Point Tracking, filed on Sep. 22, 2016, which application is a continuation application of U.S. application Ser. No. 14/552,131, entitled "Device and Method for Global Maximum Power Point Tracking," which was filed on Nov. 24, 2014, and which is a continuation application of U.S. application Ser. No. 13/324,027, entitled "Device and Method for Global Maximum Power Point Tracking," which was filed on Dec. 13, 2011, and which claims priority under 35 U.S.C. § 119(e) to U.S. Provisional Patent Application Ser. No. 61/506,602, entitled "DEVICE AND METHOD FOR GLOBAL MAXIMUM POWER POINT TRACKING," which was filed on Jul. 11, 2011, the entirety of each of which is hereby incorporated by reference.

TECHNICAL FIELD

The present disclosure relates, generally, to power converters for converting direct current (DC) power to alternating current (AC) power and, more particularly, to devices, systems, and methods for tracking a maximum power point of a DC power source to increase the overall energy extracted from the DC power source.

BACKGROUND

Power inverters convert a DC power to an AC power. For example, some power inverters are configured to convert the DC power to an AC power suitable for supplying energy to an AC grid and, in some cases, an AC load that may or may not be coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency.

In photovoltaic applications, the power delivered by each photovoltaic cell may vary in magnitude over time due to temporal variations in operating conditions including changes in sunlight intensity, angle of incidence of sunlight, ambient temperature and other factors. As such, photovoltaic cells have an operating point at which the values of the current and voltage of the cell result in an ideal or "maximum" power output. This "maximum power point" ("MPP") is a function of environmental variables, including light intensity and temperature. Inverters for photovoltaic systems may include some form of maximum power point tracking ("MPPT") as a mechanism of identifying and tracking the maximum power point ("MPP") and adjusting the inverter to exploit the full power capacity of the cell at the MPP.

Additionally, in a typical photovoltaic power system, an inverter may be associated with one or more solar cell panels. For example, some systems include strings of solar cell panels that deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels are typically small, relatively low voltage (e.g., 25 V). The inverter may be placed in close proximity to the associated solar cell panel to increase the conversion efficiency of the overall system.

SUMMARY

According to one aspect, a method for an inverter configured to convert a direct current (DC) received from a DC power source to an alternating current (AC) may include executing a maximum power point tracking algorithm to extract a substantially maximum power from the DC power source. Additionally, the method may include monitoring an output power of the DC power source while executing the maximum power point tracking algorithm and, in response to the output power of the DC power source being less than a first output power, adjusting a command signal to modify a power point of the DC source until the output power of the DC power source is above a second reference output power greater than the first reference output power.

In some embodiments, adjusting the command signal may include adjusting the command signal by multiple discrete, predetermined amounts. Additionally, in some embodiments, the command signal may be adjusted in response to the output power of the DC power source being less than the first reference output power for a first period of time. For example, the first period of time may be equal to about 10 seconds.

In some embodiments, the method may include returning to execution of the maximum power point algorithm without adjusting the command signal in response to the output power of the DC power source increasing above the second reference output power during the first period of time. Additionally, in some embodiments, the method may include, in response to the output power of the DC power source being less than the first output power, storing (i) a command signal value of the command signal and (ii) an output power value of the DC power source prior to adjusting the command signal. In such embodiments, adjusting the command signal may include adjusting the command signal until the output power of the DC power source is above the stored output power value by a reference power amount. The method may also include returning to the execution of the maximum power point algorithm using the adjusted command signal in response to the output power of the DC power source exceeding the stored output power value by the reference power amount. In some embodiments, returning to execution of the maximum power point algorithm may include returning to the execution of the maximum power point algorithm for a second time period and the method may further include monitoring the output power of the DC power source during the second time period. Additionally, the method may include performing one of (i) returning to the execution of the maximum power point algorithm using the adjusted command signal in response to the output power exceeding the second reference output power during the second time period, or readjusting the command signal to response to expiration of the second time period. In some embodiments, the second time period may be equal to about 600 seconds.

In some embodiments, the method may also include comparing the adjusted command signal to a command signal reference and returning the command signal back to the stored command signal value in response to the adjusted command signal being less than the command signal reference. In such embodiments, returning the command signal back to the stored command signal value may include adjusting the command signal by a discrete predetermined amount until the command signal substantially equals the stored command signal value.

Additionally, in some embodiments, the method may include adjusting the command signal in a first direction, comparing the adjusted command signal to a command signal reference, and adjusting the command signal in a second direction opposite the first direction in response to the adjusted command signal having a predetermined relationship with the command signal reference. Further, in some embodiments, the command signal may be embodied as a voltage command signal and adjusting the command signal may include decrementing the voltage command signal by a discrete voltage amount. Alternatively, in some embodiments, the command signal may be embodied as a current command signal and adjusting the command signal may include incrementing the current command signal by a discrete current amount.

According to another aspect, an inverter for converting direct current (DC) power from a DC power source to alternating current (AC) power may include an inverter controller configured to execute a maximum power point tracking algorithm to extract a substantially maximum power from the DC power source, the maximum power point tracking algorithm to adjust a power point of the DC power source of the inverter based on a command signal. The inverter controller may also be configured to monitor an output power of the DC power source while executing the maximum power point tracking algorithm and, in response to the output power of the DC power source being less than a first output power for a first period of time, store a command signal value of the command signal, store a power output value of the output power of the DC power source, adjust the command signal until the output power of the DC power source is above the stored power output value by a reference power amount, and return to the execution of the maximum power point algorithm using the adjusted command signal in response to the DC power source exceeding the stored power output value by the reference power amount.

In some embodiments, the inverter controller may be further configured to compare the adjusted command signal to a command signal reference and return the command signal back to the stored command signal value in response to the adjusted command signal having a predetermined relationship with the command signal reference. In such embodiments, to return the command signal back to the stored command signal value may include to adjust the command signal by a discrete predetermined amount until the command signal substantially equals the stored command signal value.

Additionally, in some embodiments, to return to execution of the maximum power point algorithm may include to return to the execution of the maximum power point algorithm for a second time period. In such embodiments, the inverter controller may be further configured to monitor the output power of the DC power source during the second time period and perform one of: return to the execution of the maximum power point algorithm using the adjusted command signal in response to the output power exceeding the second reference output power during the second time period, or (ii) readjust the command signal to response to expiration of the second time period.

In some embodiments, the inverter controller may be further configured to return to execution of the maximum power point algorithm without adjusting the command signal in response to the output power of the DC power source increasing above the second reference output power during the first period of time. Additionally, in some embodiments, the inverter controller may be configured to adjust the command signal in a first direction, compare the adjusted command signal to a command signal reference, and adjust the command signal in a second direction opposite the first direction in response to the adjusted command signal having a predetermined relationship with the command signal reference.

Further, in some embodiments, the command signal may be embodied as a voltage command signal and the inverter controller may be configured to adjust the command signal by decrementing the voltage command signal by a discrete voltage amount. Alternatively, the command signal may be embodied as a current command signal and the inverter controller may be configured to adjust the command signal by incrementing the current command signal by a discrete current amount.

According to a further aspect, an apparatus may include a solar panel and an inverter coupled to the solar panel. The solar panel may include a plurality of solar cells configured to generate a direct current (DC) power output in response to receiving an amount of sunlight. The inverter may include a converter circuit to convert the DC power output to the AC power output, a converter control circuit to control an input converter of the converter circuit based on a voltage command signal, a maximum power point tracking (MPPT) circuit, and a memory. The memory may have stored therein a plurality of instructions, which when executed by the MPPT circuit, result in the MPPT circuit executing a maximum power point tracking algorithm to generate the voltage command signal to the input converter to cause the input converter to adjust a power point of the plurality of solar cells to extract a substantially maximum power from the solar panel, monitoring the DC power output of the solar panel while executing the maximum power point tracking algorithm, and, in response to the DC output power of the solar panel being less than a first output power, adjusting the voltage command signal until the DC output power of the solar panel is above a second reference output power greater than the first reference output power.

In some embodiments, adjusting the voltage command signal may include adjusting the voltage command signal in response to the DC output power of the solar panel being less than the first reference output power for a first period of time. Additionally, in some embodiments, the plurality of instructions may further result in the MPPT circuit returning to execution of the maximum power point algorithm without adjusting the voltage command signal in response to the DC output power of the solar panel increasing above the second reference output power during the first period of time.

Additionally, the plurality of instructions may result in the MPPT circuit, in response to the DC output power of the solar panel being less than the first output power, storing a voltage command signal value of the voltage command signal and an output power value of the solar panel prior to adjusting the command signal. In such embodiments, adjusting the voltage command signal may include adjusting the voltage command signal until the DC output power of the solar panel is above the stored output power value by a reference power amount. Additionally, the plurality of instructions may further result in the MPPT circuit returning to the execution of the maximum power point algorithm using the adjusted voltage command signal in response to the DC output power of the solar panel exceeding the stored output power value by the reference power amount.

In some embodiments, returning to execution of the maximum power point algorithm may include returning to the execution of the maximum power point algorithm for a second time period. In such embodiments, the plurality of instructions further result in the MPPT circuit monitoring the DC output power of the solar panel during the second time period and performing one of returning to the execution of the maximum power point algorithm using the adjusted voltage command signal in response to the DC output power exceeding the second reference output power during the second time period, or readjusting the voltage command signal to response to expiration of the second time period. Additionally or alternatively, in some embodiments, the plurality of instructions further result in the MPPT circuit comparing the adjusted voltage command signal to a voltage command signal reference and returning the voltage command signal back to the stored voltage command signal value in response to the adjusted voltage command signal being less than the voltage command signal reference.

DETAILED DESCRIPTION

Figure 1:
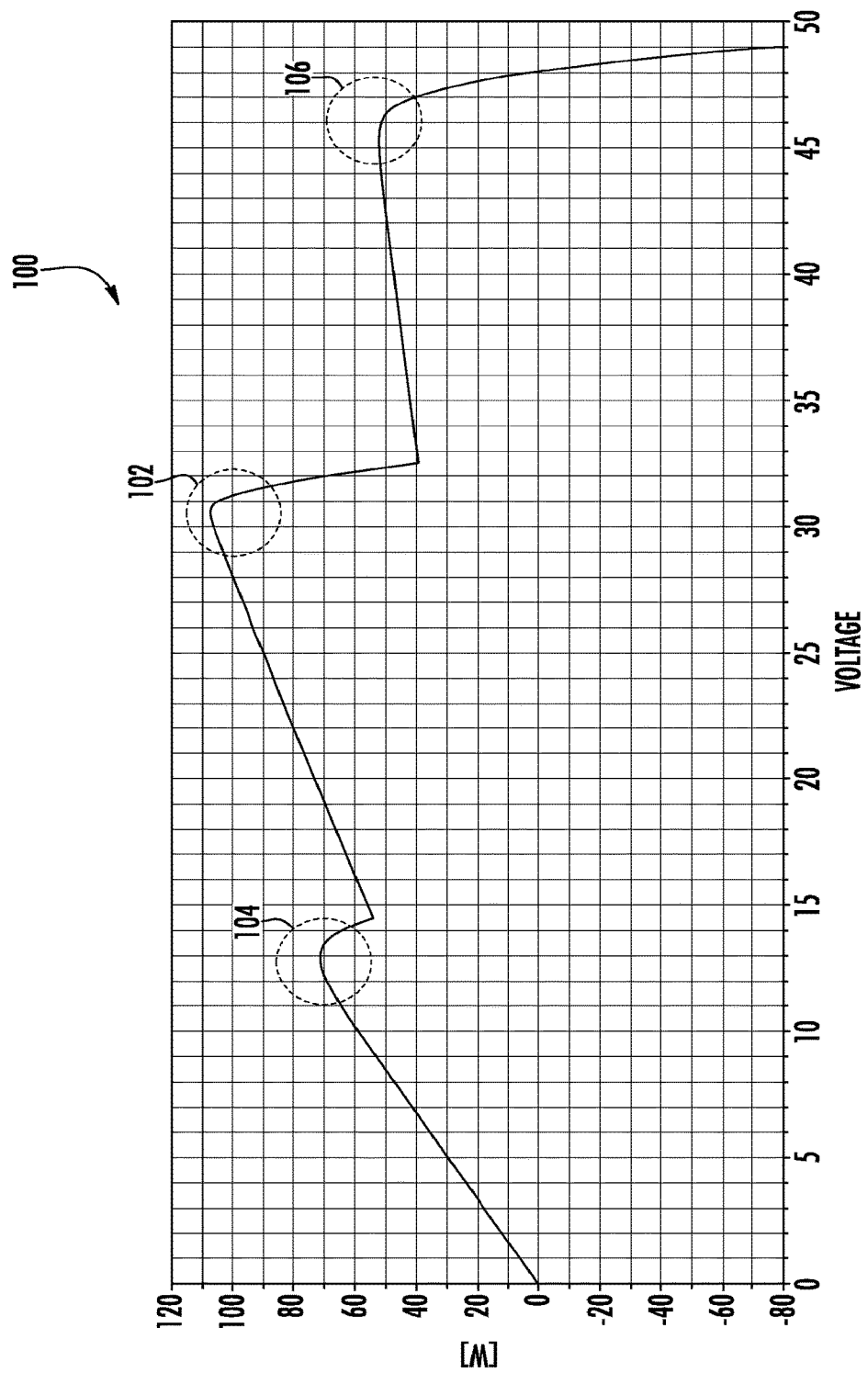
FIG. 1 is a graph of a power output of one embodiment of an AC photovoltaic module power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in the embodiments discussed below, an illustrative power inverter 206 (see FIG. 2) is configured to convert a DC power input received from a DC power source to an AC power. The inverter 206 utilizes a maximum power point tracking ("MPPT") method (see FIGS. 7 and 8) to extract a substantially maximum power from the DC power source, which is embodied as a plurality of photovoltaic solar cells (i.e., a photovoltaic module) in some embodiments. In such embodiments, the photovoltaic cells have an operating point at which the values of the output current and voltage of the cell result in an ideal or "maximum" power output, which is a function of environmental variables, including light intensity and temperature. As such, the maximum power point ("MPP") of the photovoltaic cells may shift or change over time due to such environmental variables. It should be appreciated, however, that the power output curve of a typical photovoltaic module (i.e., a plurality of photovoltaic solar cells coupled together) may have multiple local maximum power points, only one of which is a global maximum power point at a particular point in time. The illustrative inverter 206 attempts to maximize the power output of the DC power source during most operating conditions by periodically or responsively searching for a global maximum power point.

For example, as shown in FIG. 1, a graph 100 illustrates an illustrative power-voltage (P-V) curve for a typical photovoltaic module. As shown in graph 100, the power output curve of the photovoltaic module includes a plurality of local maximum power points 102, 104, 106. However, the maximum power point 102 is a global maximum power point relative to the local maximum power points 104, 106. Because typical MPPT algorithms rely on localized data for optimization, such typical MPPT algorithms may track a local maximum power point, rather than the global power tracking point. Under such conditions, the typical MPPT algorithm fails to extract the maximum power from the DC power source. However, as discussed in more detail below, the inverter 206 is configured to execute a global maximum power point method to search the P-V curve of the associated DC power source for a global maximum power point. Of course, it should be appreciated that because energy is the integral of power over time, any time spent searching for a new MPP may result in a loss of potential energy extracted from the DC power source. As such, the illustrative global maximum power point methods conduct searches for a new global maximum power point based on predetermined criteria as discussed in more detail below.

Figure 2:
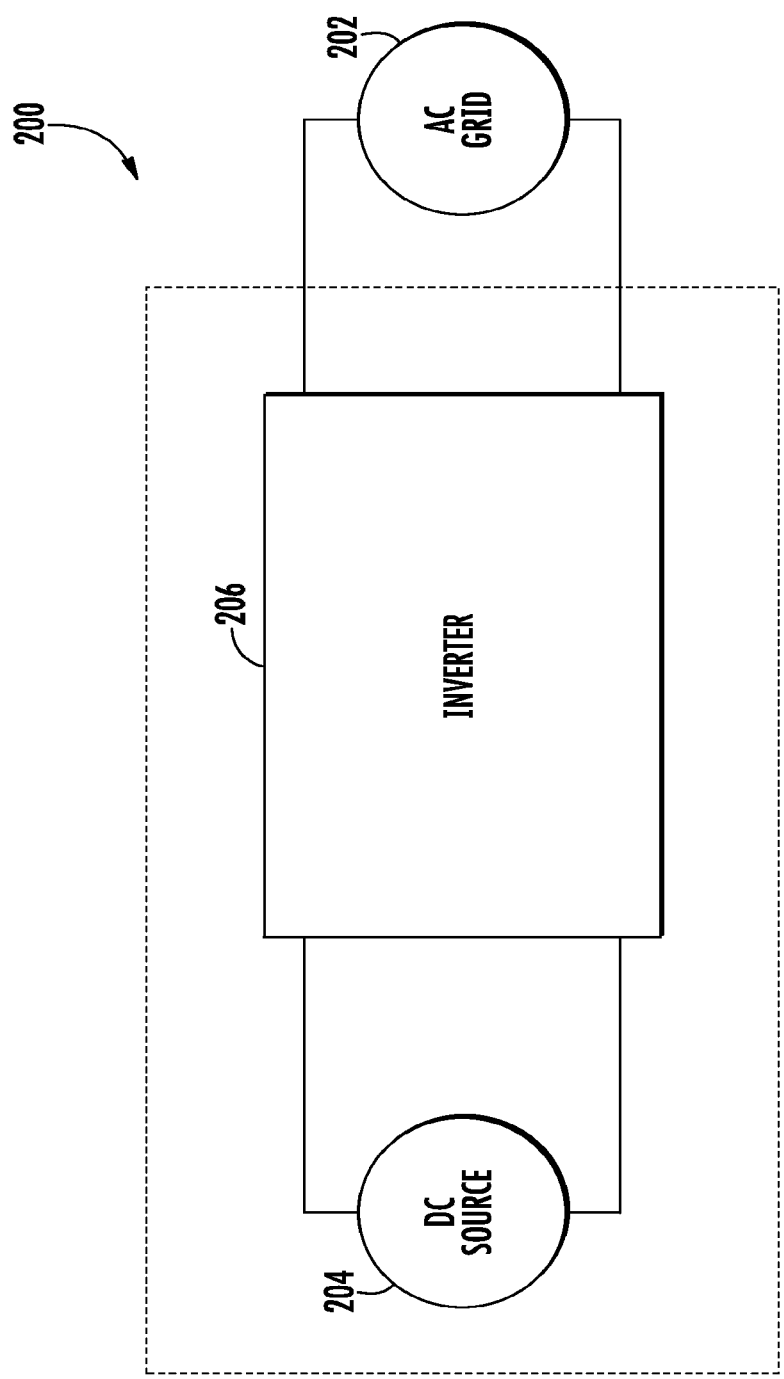
FIG. 2 is a simplified block diagram of one embodiment a system for converting DC power to AC power.

As discussed above, the inverter 206 is used to convert a DC power input to an AC power output. An illustrative system 200 utilizing the inverter 206 is illustrated in FIG. 2. In use, the system 200 supplies an alternating current (hereinafter "AC") power to an AC grid 202 at a grid frequency. The system 200 includes a direct current (hereinafter "DC") source 204 and the inverter 206. The DC source 204 may be embodied as any type of DC source configured to generate or produce a DC power, which is supplied to the inverter 206. For example, the DC source 204 may be embodied as a photovoltaic solar cell or array, a fuel cell, a wind turbine configured to generate a DC power (e.g., via a rectifying circuit), a water turbine configured to generate a DC power, or other unipolar power source.

The inverter 206 is electrically connected to the DC source 204 and configured to convert a DC waveform generated by the DC source 204 to an AC waveform suitable for delivery to the AC grid 202 and, in some embodiments, loads coupled to the AC grid 202. The AC grid 202 may be embodied as, for example, a utility power grid that supplies utility AC power to residential and commercial users. Such utility power grids may be characterized as having a generally sinusoidal bipolar voltage at a fixed grid frequency (e.g., $f=\omega/2\pi=50$ Hz or 60 Hz).

Figure 3:
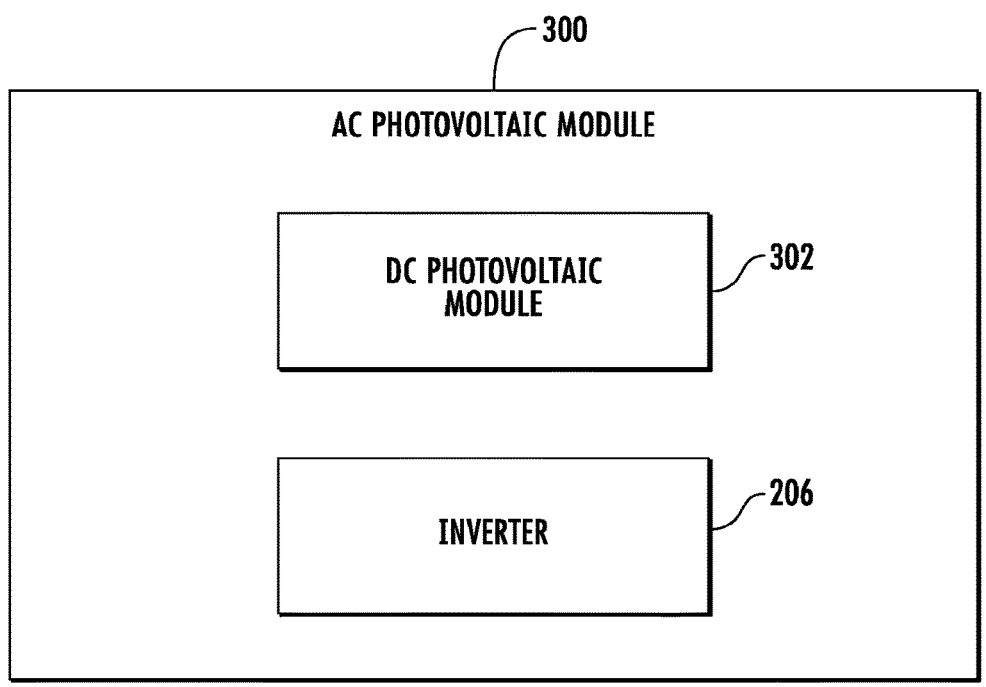
FIG. 3 is a simplified block diagram one embodiment of an AC photovoltaic module of the system of FIG. 2.

As discussed above, in some embodiments, the DC source 204 may be embodied as one or more photovoltaic cells. In such embodiments, the DC source 204 and the inverter 206 may be associated with each other so as to embody an AC photovoltaic module (ACPV) 300 as illustrated in FIG. 3. The ACPV 300 includes a DC photovoltaic module (DCPV) 302, which operates as the DC source 204, electrically coupled to the inverter 206. The DCPV 302 includes one or more photovoltaic cells and is configured to deliver a DC waveform to the inverter 206 in response to receiving an amount of sunlight. The DC power delivered by the ACPV 300 is a function of environmental variables, such as, e.g., sunlight intensity, sunlight angle of incidence and temperature. In some embodiments, the inverter 206 is positioned in a housing of the ACPV 300. Alternatively, the inverter 206 may include its own housing secured to the housing of the ACPV 300. Additionally, in some embodiments, the inverter 206 is separate from the housing, but located near the DCPV 302. As discussed above, the inverter 206 is configured to convert the DC power received from the DCPV 302 to an AC power suitable for delivery to the AC grid 202 at the grid frequency. It should be appreciated that multiple ACPVs 200 may be used to form a solar array with each ACPV 300 having a dedicated inverter 206.

Figure 4:
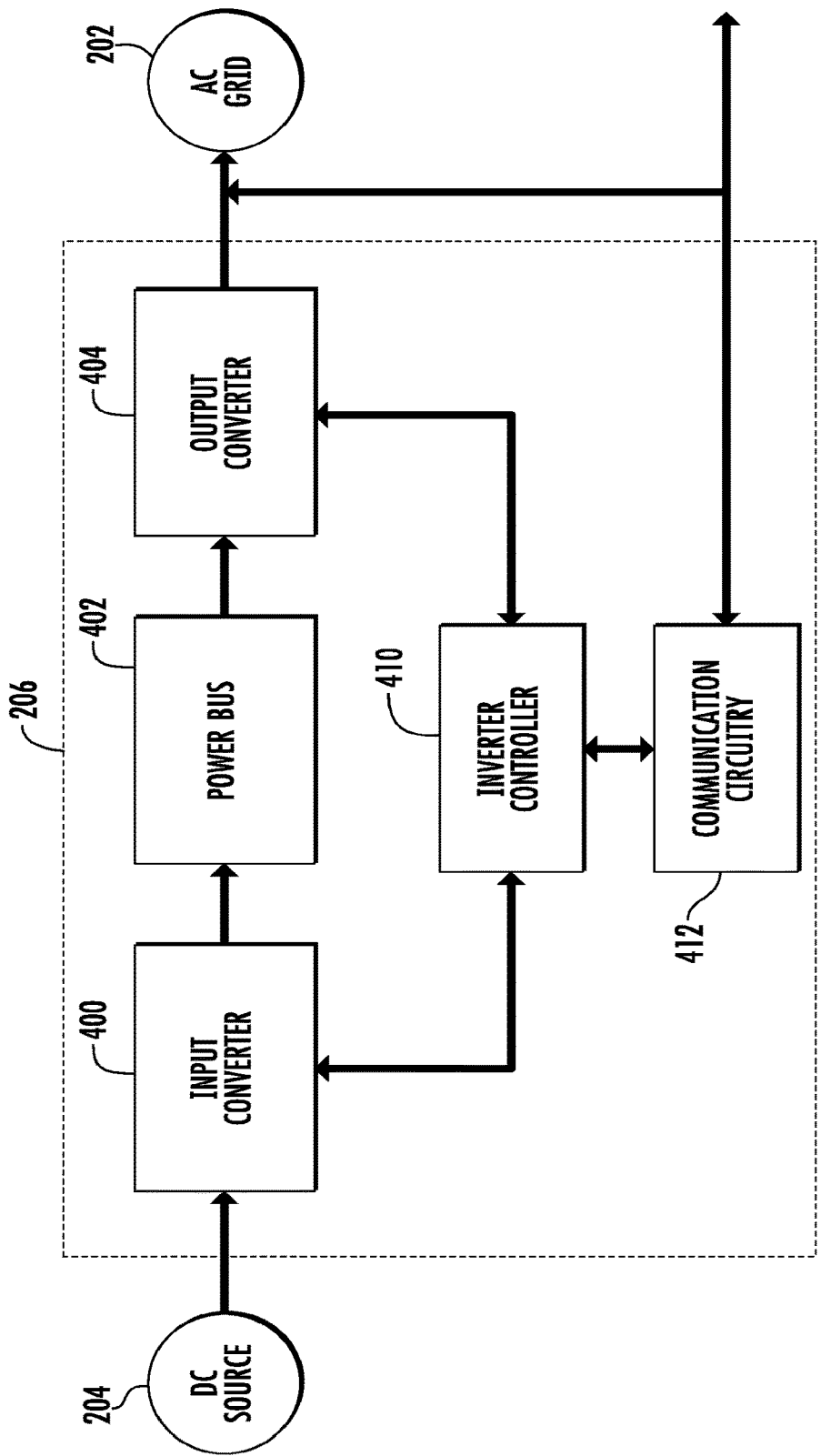
FIG. 4 is a simplified block diagram of one embodiment of an inverter of the system of FIG. 2.

Referring now to FIG. 4, in one embodiment, the inverter 206 includes an input converter 400, a power bus 402, and an output converter 404. The input converter 400 is electrically coupled to the power bus 402 and is electrically couplable to the DC source 204 as shown in FIG. 4. Similarly, the output converter 404 is electrically coupled to the power bus 402 and electrically couplable to the AC grid 202. The inverter 206 also includes an inverter controller 410, which controls the operation of the input converter 400 and the output converter 404. Although the inverter controller 410 is shown as a single controller in the embodiment of FIG. 4, the inverter controller 410 may be embodied as two separate controllers in some embodiments. That is, in some embodiments, the inverter 206 may include an input controller to control the operation of the input converter 400 and an output controller, separate from the input controller, to control the operation of the output converter 404.

Additionally, in some embodiments, the inverter 206 may include communication circuitry 412. The communication circuitry 412 may be communicatively coupled to the inverter controller 410 or may be incorporated therein in some embodiments. The inverter controller 410 may utilize the communication circuitry 412 to communicate with remote devices, such as remote controllers or servers. In one particular embodiment, the communication circuitry 412 is embodied as a power line communication circuit configured to communicate with remote devices over an AC power line, such as the AC power line interconnects coupled to the output of the output converter 404. However, in other embodiments, other communication technologies and/or protocols may be used. For example, in some embodiments, the communication circuitry 412 may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol.

In use, the input converter 400 of the inverter 206 is configured for electrically coupling the DC source 204 to receive a DC waveform therefrom. The input converter 400 converts the DC waveform to a bus waveform, which in the illustrative embodiment is a DC waveform but may be an AC waveform in other embodiments. Similarly, the output converter 404 is configured to be electrically coupled to the AC grid 202 and convert the bus waveform (i.e., either a DC waveform or an AC waveform) to the output AC waveform at the grid frequency for delivery to the AC grid 202.

As discussed above, the inverter controller 410 is electrically coupled to the input converter 400 and configured to control the operation of the input converter 400 to convert the input DC waveform from the DC source 204 to a bus waveform (e.g., a DC bus waveform) at the power bus 402. To do so, the inverter controller 410 may provide a plurality of switching and/or control signals to various circuits of the input converter 400. Additionally, as discussed below, the inverter controller 410 controls the operation of the input converter 400 based on a global maximum power point tracking ("MPPT") method.

Illustratively, the inverter controller 410 is also electrically coupled to the output converter 404 and configured to control the operation of the output converter 404 to convert the bus waveform to the output AC waveform suitable for delivery to the AC grid 202. In the illustrative embodiment as discussed in more detail below, the inverter controller 410 is configured to use a pulse width modulation ("PWM") algorithm to control the output converter 404 such that the output AC waveform is pulse width modulated. To do so, the inverter controller 410 may provide a plurality of switching and/or control signals to various circuits of the output converter 404.

Figure 5:
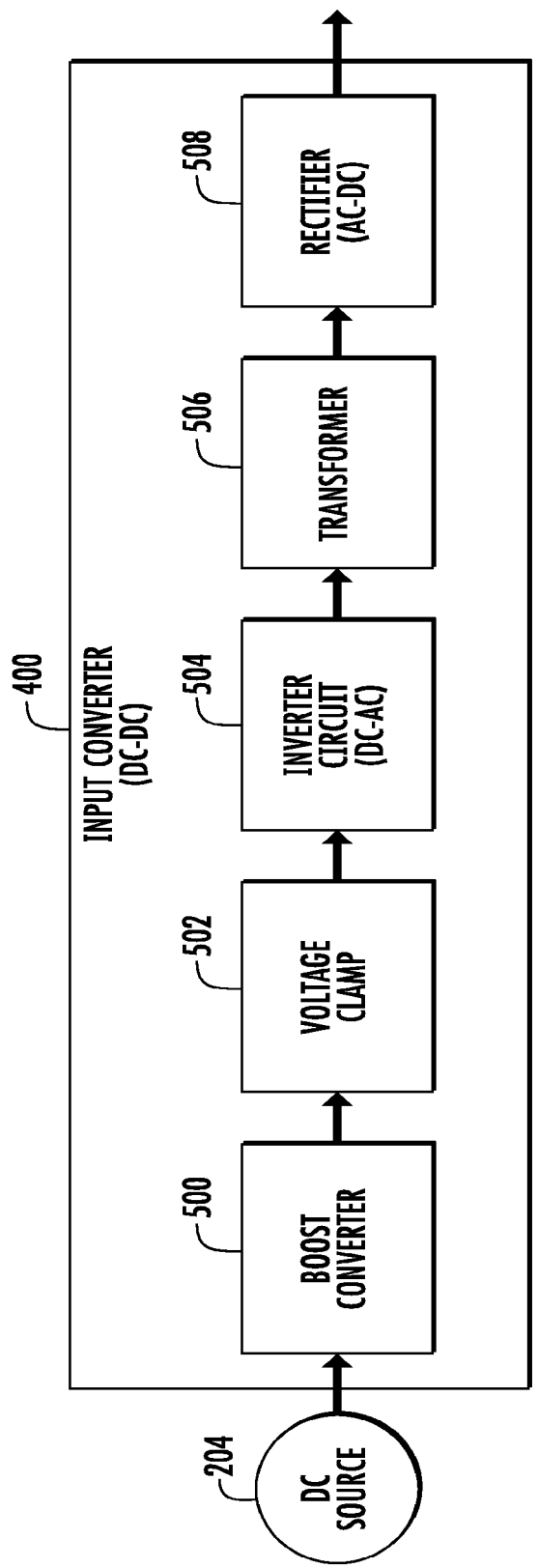
FIG. 5 is a simplified block diagram of one embodiment of an input converter of the inverter of FIG. 4.

Referring now to FIG. 5, in one illustrative embodiment, the input converter 400 is embodied as a DC-to-DC converter. The input converter 400 includes a boost converter 500, a voltage clamp 502, an inverter circuit 504, a transformer 506, and a rectifier 508. The boost converter 500 is embodied as an isolated boost converter and is electrically coupled to the voltage clamp 502 and the inverter circuit 504. The voltage clamp 502 is embodied as an active voltage clamp configured to clamp the voltage of the inverter circuit 504 to a predetermined maximum value based on a switching signal. The inverter circuit 504 is embodied as a DC-to-AC inverter circuit configured to convert the DC waveform supplied by the DC source 204 to an AC waveform delivered to a primary coil of the transformer 506. The transformer 506 may be embodied as a two or more winding transformer having a primary winding electrically coupled to the inverter circuit 504 and a secondary winding coupled to the rectifier 508. The transformer 506 is configured to convert the first AC waveform supplied by the inverter circuit 504 at the primary winding to a second AC waveform at the secondary winding. The first and second AC waveforms may have substantially equal frequency and may or may not have substantially equal voltages. The rectifier circuit 508 is electrically coupled to the secondary winding of the transformer 506 and configured to rectify the second AC waveform to a DC waveform supplied to the power bus 402. Of course, it should be appreciated that input converters having other circuit topology and/or additional or fewer modules may be used in other embodiments.

Figure 6:
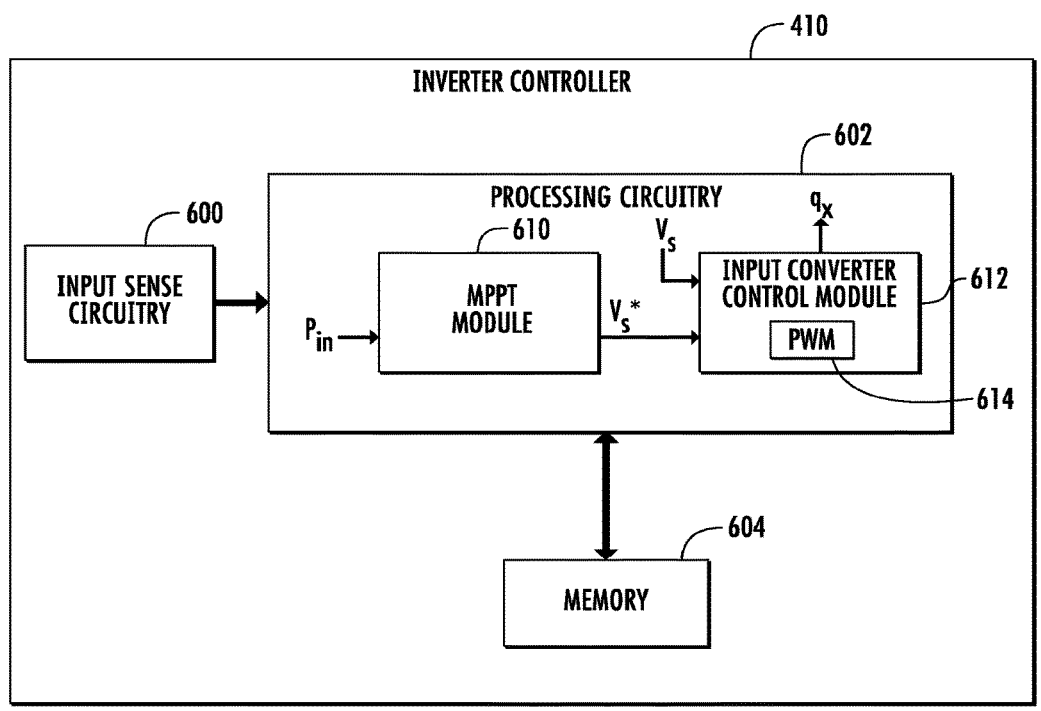
FIG. 6 is a simplified block diagram of one embodiment of an input controller of the inverter of FIG. 4.

Referring now to FIG. 6, one illustrative embodiment of the inverter controller 410 is shown. As discussed above, the inverter controller 410 controls the operation of the input converter 400 and, in some embodiments, the output converter 404. Illustratively, the inverter controller 410 includes input sense circuitry 600, processing circuitry 602, and memory 604. Of course, it should be appreciated that the inverter controller 410 may include other devices and/or circuitry in other embodiments. The input sense circuitry 602 includes a plurality of sensing circuits to sense various currents and voltages of the inverter 206. In the illustrative embodiment, the input sense circuitry 602 is configured to sense the output voltage of the DC source 204, the output current of the DC source 204, and the voltage of the power bus 402. However, in other embodiments, additional or other currents and/or voltages may be sensed or otherwise measured by the input sense circuitry 602.

The processing circuit 602 may be embodied as any type of processing circuitry capable of performing the functions described herein. For example, the processing circuit 602 may be embodied as one or digital signal processors, microprocessors, microcontrollers, or the like. Such processors may have one or more processing cores. Similarly, the memory 604 may be embodied as one or more memory device or data storage locations including, for example, dynamic random access memory devices (DRAM), synchronous dynamic random access memory devices (SDRAM), double-data rate synchronous dynamic random access memory device (DDR SDRAM), flash memory devices, and/or other volatile memory devices. Additionally, although only a single memory 604 is illustrated in FIG. 6, it should be appreciated that the inverter controller 410 may include additional memory devices in some embodiments.

The processing circuitry 602 includes a plurality of control modules, which may be embodied as firmware/software programs (e.g., stored in the memory 604), discrete hardware circuitry, and/or a combination of hardware and software. In the illustrative embodiment, the processing circuitry 602 includes an MPPT control module 610 and an input converter control module 612. Of course, it should be appreciated that additional or other modules, functionality, and features may be included in the processing circuitry 604 depending on the particular implementation. For example, in embodiments wherein the inverter controller 410 also controls the output converter 404, the processing circuitry 604 includes an output converter control module.

The MPPT control module 610 provides global maximum power point tracking of the DC power source 204. To do so, the MPPT control module 610 is configured to sense, receive, or otherwise calculate the input power, $P_{IN}$, supplied by the DC power source 204. The MPPT control module 610 may be configured to directly sense the input power, $P_{IN}$, or to derive the input power, $P_{IN}$, based on other signals such as the voltage, $V_S$, or current, $I_S$, of the DC power supply 204. Additionally, it should be appreciated that in other embodiments, the MPPT control module 610 may receive additional input signals.

Figure 7:
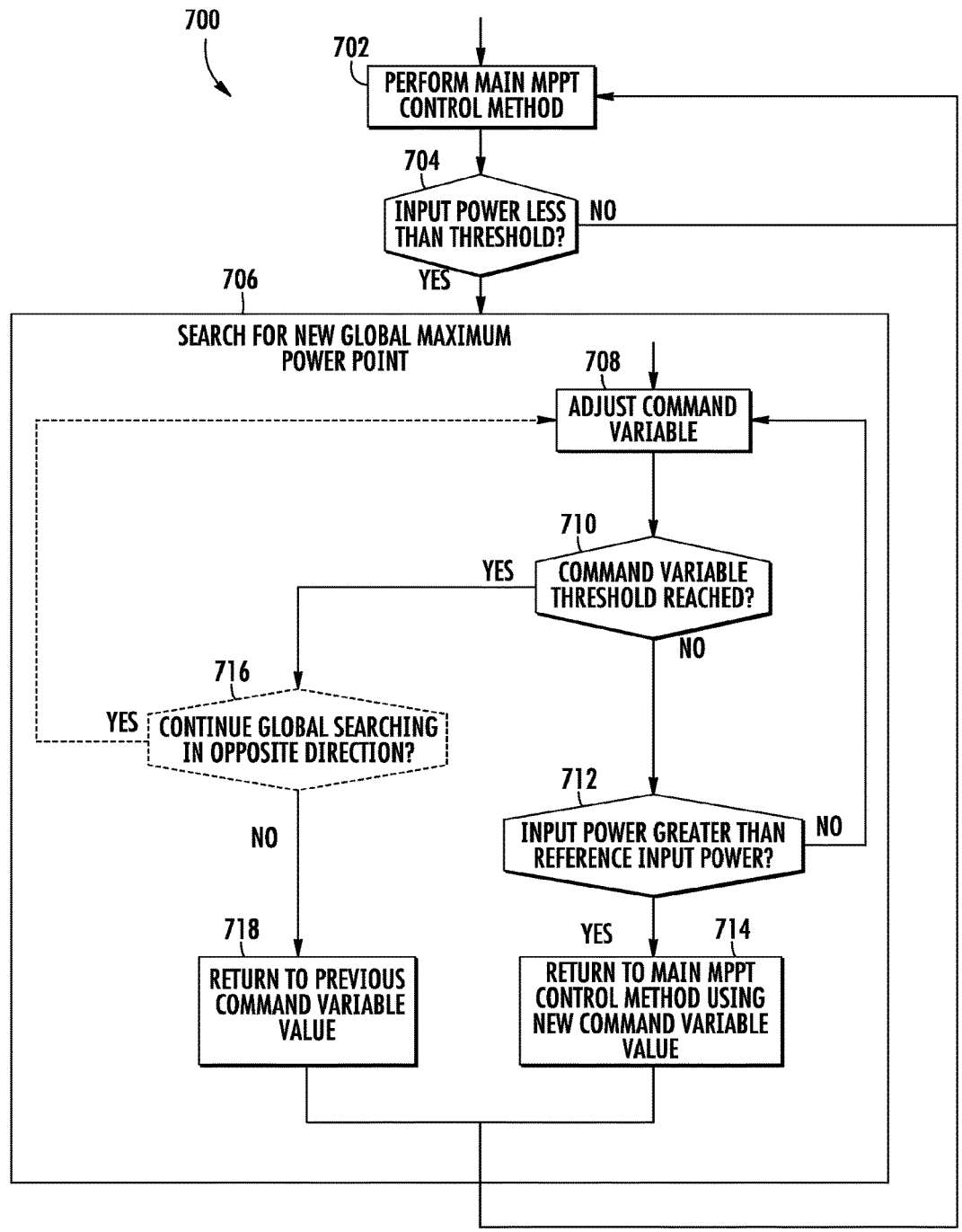
FIG. 7 is a simplified flow diagram of one embodiment of a global maximum power point tracking method.

The MPPT control module 610 executes a global maximum power point tracking method as discussed in more detail below in regard to FIGS. 7 and 8. As a function of the global maximum power point tracking method, the MPPT control module 610 generates a command signal based on the input power, $P_{IN}$, of the DC power source 204. In the illustrative embodiment, the command signal is embodied as a reference voltage command signal, $V_S^*$. However, in other embodiments, the command signal generated by the MPPT control module 610 may be embodied as other types of command signals such as a reference current command signal, a reference impedance command signal, a reference duty ratio command signal, or the like. The MPPT control module 610 supplies the voltage command signal, $V_S^*$, to the input converter control module 612.

As discussed above, the input converter control module 612 controls the operation of the input converter 400. To do so, the input converter control module 612 generates a plurality of switch control signals, $q_x$, to control a plurality of switches of the input converter 400. In the illustrative embodiment, the input converter control module 612 utilizes a pulse width modulation (PWM) control module 614 to generate the control signals, $q_x$, based on a plurality of inputs including the voltage command signal, $V_S^*$, and a feedback signal of the input voltage of the DC power source 204, $V_S$. As a function of the control signal, $q_x$, the power point of the DC power source 204 is modified, which in turn adjusts or modifies the input power, $P_{IN}$, generated by the DC power source 204. The input converter control module 612 may also perform various safety and/or quality verification checks on the input converter 400 such as ensuring that the input voltage to the input converter 400 and the voltage of the power bus 402 are within predetermined ranges.

As discussed above, the MPPT control module 610 is configured to execute a global maximum power point tracking method in which the MPPT control module 640 performs a power curve search for the global maximum power point based on particular criteria. One illustrative embodiment of a global maximum power point tracking method 700 that may be executed be the MPPT control module 610 is shown in FIG. 7. The method 700 begins with block 702 in which the main MPPT control method is executed. To do so, the MPPT control module 610 may use any known MPPT algorithm to monitor the power output of the DC power source 204 (e.g., a PV module) and generate the command signal based on an MPPT algorithm (see, e.g., U.S. Patent Publication No. 2008/0183338, entitled "Ripple Correlation Control Based on limited Sampling" by Jonathan W. Kimball et al.). As discussed above, the command signal may be embodied as a reference voltage command signal, a reference current command signal, a reference impedance command signal, a reference duty cycle command signal, or the like.

While executing the main MPPT control method in block 702, the MPPT control module 610 monitors the DC input power, $P_{IN}$, supplied by the DC power source 204 in block 704. As discussed above, the DC input power, $P_{IN}$, may be sensed, calculated, or otherwise derived by the MPPT control module 610. While the input power, $P_{IN}$, remains above a lower reference threshold power level, the method 700 loops back to block 702 in which the MPPT control module 610 continues to execute the main MPPT control method. However, if the input power, $P_{IN}$, drops below the lower reference threshold power level, the MPPT control module 610 determines that a shading event has occurred, and the method 700 advances to block 706 in which the MPPT control module 610 searches for a new global maximum power point. It should be appreciated that in some embodiments, the method 700 may incorporate a form of hysteresis to ensure that the shading event is not transitory or otherwise temporary (e.g., quick overshadowing of a portion of the solar cells of the DC photovoltaic module 302). For example, as discussed in more detail below in regard to method 800, a wait period may be used to ensure that the DC input power, $P_{IN}$, remains below the lower reference threshold power level for a reference period of time.

As discussed above, the MPPT control module 610 searches for a new global maximum power point in block 706. To do so, the command signal is adjusted in block 708 by a reference amount. As discussed above, the command signal may be a voltage command signal, a current command signal, an impedance command signal, a duty cycle command signal, or the like. Depending on the type of command signal and/or other criteria, the command signal may be incremented or decremented in block 708. For example, in embodiments in which the command signal is embodied as a reference voltage command signal, the command signal is decremented in block 708 by the reference amount.

In block 710, the MPPT control module 610 determines whether the command signal has reached a reference command signal threshold level. The command signal threshold level is selected to ensure that the command signal is not decremented or incremented to a value too small or too large for the inverter 206. As such, the reference command signal may be an upper and/or lower threshold level. If the command signal has not reached the command signal threshold level, the method 700 advances to block 712 in which the MPPT control module 610 monitors the DC input power, $P_{IN}$, of the DC source 204 to determine whether it has increased to a level greater than a reference input power level. In some embodiments, the reference input power level may be based on, a function of, or substantially equal to a previous power level (e.g., the input power level, $P_{IN}$, just prior to execution of block 706), the lower threshold power level of block 704, a predefined input power level, and/or the like. Again, an amount of hysteresis may be incorporated into the reference input power level to ensure the MPPT control module 610 does not continually jump into and out of the search for a new global maximum power point. For example, in some embodiments, the reference input power level is defined as a predetermined reference amount greater than the DC input power level, $P_{IN}$, just prior to execution of block 706 (i.e., the previous input power level prior to searching for a new global maximum power point).

If the DC input power, $P_{IN}$, is not greater than the reference input power level, the method 700 loops back to block 708 in which the command variable is adjusted further as discussed above. However, if the MPPT control module 610 determines that the DC input power, $P_{IN}$, has increased to a level greater than the reference input power, the method 700 advances to block 714 in which the MPPT control module 610 returns to the main MPPT control method of block 702 using the newly adjusted command signal. In this way, a new global maximum power point is determined by adjusting the command signal until the DC input power level, $P_{IN}$, is greater than the reference input power level. It should be appreciated that the reference input power level may be selected to ensure that a global maximum power point is found rather than a local maximum power point (i.e., a power point in which the DC input power level is greater than the previous input power level but less than the input power level at the global maximum power point).

Referring back to block 710, if the MPPT control module 610 determines that the command signal has reached the reference threshold level, the method 700 advances to block 716 in some embodiments. In such embodiments, the MPPT control module 610 determines whether global searching should continue in the opposite direction in block 716. That is, the MPPT control module 610 may be configured to initially search the power curve in one direction and subsequently search the power curve in the opposite direction if no global maximum power point is found. For example, the MPPT control module 610 may be configured to initially decrement the command signal until the command signal reaches a reference lower threshold value (or until a new global maximum power point is found) and subsequently increment the command signal until the command signal reaches a reference upper threshold value (or until a new global maximum power point is found).

If the MPPT control module 610 determines that global searching should continue in the opposite direction in block 716, the method 700 loops back to block 708 in which the command signal is adjusted in the opposite direction. However, if the MPPT control module 610 determines that no additional global searching is to be performed, the method 700 advances to block 718 in which the command signal is returned to the amount of the previous command signal prior to execution of block 706 (i.e., the command variable amount prior to searching for a new global maximum power point). In some embodiments, the command signal is adjusted or stepped to the previous command variable gradually.

Accordingly, the MPPT control module 610 executes the method 700 to perform a standard MPPT control method until the DC power input, $P_{IN}$, from the DC power source 204 drops below a threshold level. In response, the MPPT control module 610 is configured to search for a new global maximum power point by adjusting the command signal until the DC power input, $P_{IN}$, reaches or surpasses a reference input power level, which is selected to ensure a global maximum power point has found. As discussed above, the power curve may be searched in an incrementing direction, a decrementing direction, or in both directions depending on the type of command signal used, the particular implementation, and/or other criteria.

Figure 8:
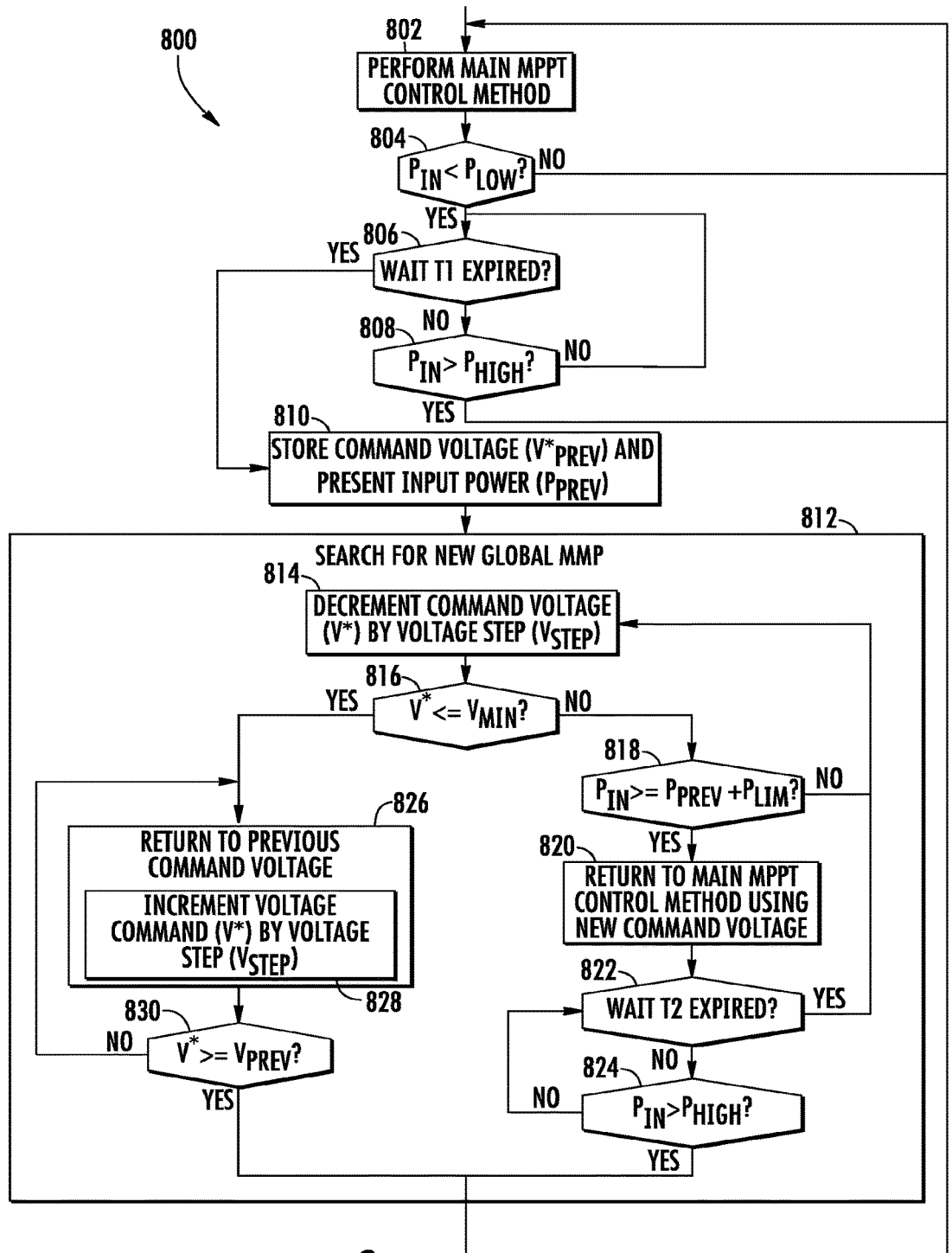
FIG. 8 is a simplified flow diagram of another embodiment of a global maximum power point tracking method.

Referring now to FIG. 8, in another embodiment, the MPPT control module 610 may be configured to execute a global maximum power point tracking method 800. The method 800 is described below in regard to use of a reference voltage command signal. However, as discussed above in regard to the method 700 of FIG. 7, the command signal may be embodied as a reference current command signal, a reference impedance command signal, a reference duty cycle command signal, or other command signal in other embodiments.

The method beings with block 802 in which the main MPPT control method is executed. To do so, as discussed above, the MPPT control module 610 may use any known MPPT method to monitor the power output of the DC power source 204 (e.g., a PV module) and generate a command signal based on an MPPT algorithm (see, e.g., U.S. Patent Publication No. 2008/0183338, entitled "Ripple Correlation Control Based on Limited Sampling" by Jonathan W. Kimball et al.). While executing the main MPPT control method in block 802, the MPPT control module 610 monitors the DC power input, $P_{IN}$, supplied by the DC source 204 to the inverter 206 in block 702. As discussed above, the DC input power, $P_{IN}$, may be sensed, calculated, or otherwise derived by the MPPT control module 610. If the power input, $P_{IN}$, is determined to be less than a lower reference threshold level, $P_{LOW}$, the method 800 advances to block 806 in which a first wait state is established. In on illustrative embodiment, the lower reference threshold level, $P_{LOW}$, is selected to be 50 W, but may be set to other values in other embodiments.

During the wait state of block 806, the MPPT control module 610 waits for a period of time, T1, to ensure that the decreased power input, $P_{IN}$, from the DC source 204 is not temporary (e.g., a quick overshadowing or covering of a portion of the solar cells of the DC photovoltaic module 302). In one illustrative embodiment, the predetermined period of time, T1, is set to about 10 seconds, but may be longer or shorter in other embodiments.

During the first wait state of block 806, the MPPT control module 612 also monitors the DC power input, $P_{IN}$. If the power input, $P_{IN}$, is determined to have increased above a upper reference threshold level, $P_{HIGH}$, in block 808, the method 800 loops back to block 802 in which the main MPPT control method is continued. In this way, the MPPT control module 610 includes an amount of hysteresis to ensure the shading event is not transitory or otherwise temporary. In one illustrative embodiment, the upper reference threshold level, $P_{HIGH}$, is selected to be 120 W.

Figure 9:
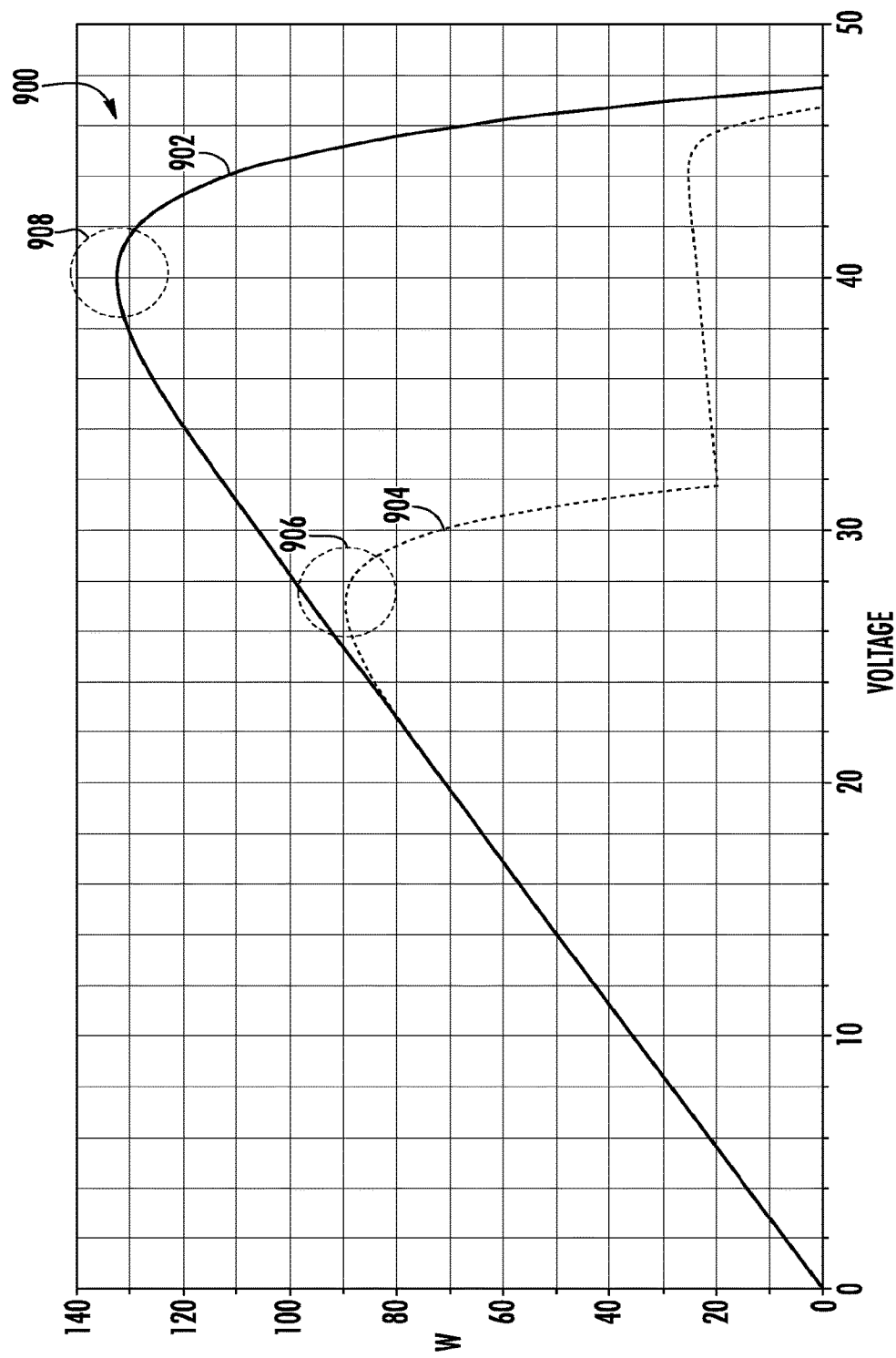
FIG. 9 is a comparison graph of the power outputs of a shaded and an unshaded AC photovoltaic module.

If, however, the first wait state of block 806 expires prior to the DC power input, $P_{IN}$, increasing above the upper reference threshold level, $P_{HIGH}$, the MPPT control module 610 determines that a long-term shading event has occurred and searches for a new global maximum power point. For example, as shown in FIG. 9, a graph 900 illustrates the power output curve of a photovoltaic module 902 that is free from any long term shading and the power output curve of a photovoltaic module 904 that has a portion of its solar cells shaded. As shown in the graph 900, the power output of the photovoltaic module 904 has a maximum power point 906 that is much lower than the maximum power point 908 of the photovoltaic module 902. As such, it should be appreciated that when the photovoltaic module 902 is operating near maximum rated power, it is unlikely that a shading event is occurring, and the power curve of the photovoltaic module 902 has a clearly defined global maximum power point. However, if the power output drops below a threshold value (e.g., to the power output level of the photovoltaic module 904), the power curve may have multiple local maximum power points and, as such, a search for the global maximum power point may be beneficial during these periods (rather than searching continuously). Of course, in other embodiments, the MPPT control module 610 may be configured to continuously search for the global maximum power point.

Referring back to FIG. 8, if the MPPT control module 610 determines that first wait state has expired in block 806, the method 800 advances to block 810 in which the present command voltage signal, $V^*_{PREV}$, and the present input power, $P_{PREV}$, are stored in the memory 604. As discussed above, the command signal may be embodied as signals other than a voltage command signal in other embodiments.

After the present command voltage signal, $V^*_{PREV}$, and the present input power, $P_{PREV}$, have been stored in block 810, the MPPT control module 610 searches for a new global maximum power point in block 812. To do so, the command voltage signal is decremented by a reference amount, $V_{STEP}$, in block 814. The value of the reference voltage step, $V_{STEP}$, may be selected such that the input power, $P_{IN}$, does not abruptly change. For example, in one illustrative embodiment, $V_{STEP}$ is equal to about 0.1 V, but may be equal to other amounts in other embodiments.

After the command voltage signal, $V^*$, has been decremented, the MPPT control module 610 determines whether the command voltage variable, $V^*$, is less than or equal to a reference minimum threshold voltage, $V_{MIN}$, in block 816. As discussed above in regard to the method 700 of FIG. 7, the reference minimum threshold voltage may be selected so as to ensure the command voltage signal is not decremented to such a low value as to adversely affect the functioning of the inverter 206. In one illustrative embodiment, the reference minimum threshold voltage, $V_{MIN}$, is selected to be equal to about 24 V, but may be equal to other values in other embodiments. If the command voltage signal, $V^*$, is greater than the reference minimum voltage, $V_{MIN}$, the method 800 advances to block 818 in which the MPPT control module 610 determines whether the DC input power, $P_{IN}$, is greater than a reference amount, $P_{LIM}$, above the previous input power, $P_{PREV}$. The reference amount, $P_{LIM}$, may be selected so as to ensure a global maximum power point has been found, rather than a local maximum power point. In one illustrative embodiment, $P_{LIM}$ is equal to about 5 W, but may be set greater or lesser amounts in other embodiments.

If the DC input power, $P_{IN}$, is not greater than the reference amount above the previous input power ($P_{PREV}+P_{LIM}$), the method 800 loops back to block 814 in which the voltage command signal is decremented again. If, however, the input power, $P_{IN}$, is greater than the reference amount above the previous input power ($P_{PREV}+P_{LIM}$), the method 800 advances to block 820 in which the MPPT control module 610 returns to executing the main MPPT control method using the new voltage command signal. Additionally, in block 822, a second wait state is established. During the second wait state of block 822, the MPPT control module 610 waits a period of time, T2, and monitors the DC power input, $P_{IN}$. If the power input, $P_{IN}$, is determined to have further increased above the reference upper threshold level, $P_{HIGH}$, in block 824, the method 800 exits the global maximum power point search block 812 and loops back to block 802 in which the main MPPT control method is continued using the new command voltage signal. However, if the power input, $P_{IN}$, is determined to be less than the predetermined upper threshold level, $P_{HIGH}$, the method 800 loops back to block 822 in which the second wait state is continued.

If the second wait state of block 722 expires prior to the power input, $P_{IN}$, increasing above the predetermined upper threshold level, $P_{HIGH}$, the method 800 loops back to block 814 wherein the voltage command signal, $V^*$, is decremented again. In this way, the main MPPT control method is executed with the new command variable, which is greater than the reference amount above the previous input power ($P_{PREV}+P_{LIM}$), for a period of time until (i) the input power, $P_{IN}$, increases again above the predetermined upper threshold level, $P_{HIGH}$, or (ii) the second wait state expires. Upon expiration of the second wait state, the method 800 advances to block 814 wherein the global maximum power point search is continued. In the illustrative embodiment, the period of time, T2, of the second wait state is selected such that T2>T1. For example, in one illustrative embodiment, T2 is equal to about 600 seconds.

Referring now back to block 816, if the MPPT control module 610 determines that the command voltage signal, $V^*$, is less than or equal to a reference minimum threshold voltage, $V_{MIN}$, the method 800 advances to block 826 in which the command voltage signal, $V^*$, is returned to the previous command voltage level, $V^*_{PREV}$. To do so, the command voltage signal, $V^*$, is incremented by the predetermined amount, $V_{STEP}$, in block 828. After the command voltage, $V^*$, has been incremented in block 828, the MPPT control module 610 determines whether the command voltage signal, $V^*$, is greater than or equal the previous command voltage signal, $V^*_{PREV}$, in block 830. If not, the method 800 loops back to block 826 and 828 in which the command voltage signal, V*, is further incremented. However, if the command voltage signal, V*, is determined to be greater than or equal the previous command voltage command signal, $V^*_{PREV}$, in block 830, the method 800 loops back to block 802 in which the main MPPT control method is continued using the previous voltage command signal.

In this way, the MPPT control module 610 executes the method 800 to perform a search for a new global maximum power point during events in which the output power from the DC source 204 falls below a predetermined threshold for a predetermined amount of time. That is, rather than continuously performing the power curve search of the method 800, the search is performed only during conditions of shading or overcast in which the power output of the inverter 206 is substantially less than its rated power. Accordingly, the search for a new global maximum power point is executed during conditions when it is beneficial.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. An inverter for converting direct current (DC) power from a DC power source to alternating current (AC) power, the inverter comprising:
   an input converter configured for electrically coupling to the DC power source and converting a DC waveform to a bus waveform on a power bus; and
   an inverter controller electrically coupled to the input converter and configured to control operation of the input converter based on a global maximum power tracking ("MPPT") method, the inverter controller comprising:
      input sense circuitry configured to sense the input power of the DC power source;
      an MPPT control module configured to:
         execute a global MPPT method to search in a first direction for the global maximum power point; and
         generate a command signal based on the input power of the DC power source; and
      an input converter control module configured to:
         receive the command signal from the MPPT control module;
         receive a feedback signal of the input voltage of the DC power source; and
         in response to the command and feedback signals, generate a plurality of switch control signals to control a plurality of switches of the input converter to adjust the power point of the DC power source;
      whereby a substantially maximum power is extracted from the DC power source.

2. The inverter of claim 1, wherein the global MPPT method comprises:
   monitoring the input power of the DC power source;
   in response to the input power of the DC power source being less than a threshold, adjusting a value of the command signal and returning to monitoring the input power of the DC power source with the adjusted command signal value; and
   in response to the input power of the DC power source not being less than the threshold, returning to monitoring the input power of the DC power source without adjusting the command signal value.

3. The inverter of claim 2, wherein the global MPPT method further comprises:
   after adjusting the command signal value, determining if the command signal value has reached a command variable threshold; and
   in response to the command signal value not reaching a command variable threshold, performing one of:
      returning to monitoring the input power of the DC power source with the adjusted command signal value in response to the input power of the DC power source being greater than the reference input power; and
      returning to adjusting the command signal value in response to the input power of the DC power source being not greater than a reference input power.

4. The inverter of claim 3, wherein the global MPPT method further comprises, in response to the command signal value reaching a command variable threshold, performing one of:
   executing the global MPPT method in a second direction, opposite the first direction with the adjusted command signal value; and
   returning to monitoring the input power of the DC power source with the unadjusted command signal value.

5. The inverter of claim 2, wherein the command signal value is adjusted in response to the input power of the DC power source being less than the threshold for a predetermined period of time.

6. The inverter of claim 5, wherein the command signal value is not adjusted in response to the input power of the DC power source being less than the threshold for less than the predetermined period of time.

7. The inverter of claim 1, wherein:
   the inverter further comprises an output converter configured for electrically coupling to an AC grid and converting the bus waveform to the AC power; and
   the inverter controller further comprises an output converter control module configured to control operation of the output converter through a pulse width modulation ("PWM") method.

8. The inverter of claim 1, wherein the command signal is a voltage command signal and adjusting the command signal value comprises adjusting the voltage command signal by a discrete voltage amount.

9. The inverter of claim 1, wherein the command signal is a current command signal and adjusting the command signal value comprises adjusting the current command signal by a discrete current amount.

10. The inverter of claim 1, further comprising communication circuitry communicatively coupled to the inverter controller and configured to communicate with remote devices.

11. A system for converting direct current (DC) power from a DC power source to alternating current (AC) power, the system comprising:
   an input converter configured for electrically coupling to the DC power source and converting a DC waveform to a bus waveform on a power bus; and
   an inverter controller electrically coupled to the input converter and configured to control operation of the input converter based on a global maximum power tracking ("MPPT") method, the inverter controller comprising:

input sense circuitry configured to sense the input power of the DC power source;

an MPPT control module configured to:

execute a global MPPT method to search in a first direction for the global maximum power point; and generate a command signal based on the input power of the DC power source; and an input converter control module configured to:

receive the command signal from the MPPT control module;

receive a feedback signal of the input voltage of the DC power source; and in response to the command and feedback signals, generate a plurality of switch control signals to control a plurality of switches of the input converter to adjust the power point of the DC power source;

whereby a substantially maximum power is extracted from the DC power source.

12. The system of claim 11, wherein the global MPPT method comprises:

monitoring the input power of the DC power source;

in response to the input power of the DC power source being less than a threshold, adjusting a value of the command signal and returning to monitoring the input power of the DC power source with the adjusted command signal value; and in response to the input power of the DC power source not being less than the threshold, returning to monitoring the input power of the DC power source without adjusting the command signal value.

13. The system of claim 12, wherein the global MPPT method further comprises:

after adjusting the command signal value, determining if the command signal value has reached a command variable threshold; and in response to the command signal value not reaching a command variable threshold, performing one of:

returning to monitoring the input power of the DC power source with the adjusted command signal value in response to the input power of the DC power source being greater than the reference input power; and returning to adjusting the command signal value in response to the input power of the DC power source being not greater than a reference input power.

14. The system of claim 13, wherein the global MPPT method further comprises, in response to the command signal value reaching a command variable threshold, performing one of:

executing the global MPPT method in a second direction, opposite the first direction with the adjusted command signal value; and returning to monitoring the input power of the DC power source with the unadjusted command signal value.

15. The system of claim 12, wherein the command signal value is adjusted in response to the input power of the DC power source being less than the threshold for a predetermined period of time.

16. The system of claim 15, wherein the command signal value is not adjusted in response to the input power of the DC power source being less than the threshold for less than the predetermined period of time.

17. The system of claim 11, wherein:

the inverter further comprises an output converter configured for electrically coupling to an AC grid and converting the bus waveform to the AC power; and the inverter controller further comprises an output converter control module configured to control operation of the output converter through a pulse width modulation ("PWM") method.

18. The system of claim 11, wherein the command signal is a voltage command signal and adjusting the command signal value comprises adjusting the voltage command signal by a discrete voltage amount.

19. The system of claim 11, wherein the command signal is a current command signal and adjusting the command signal value comprises adjusting the current command signal by a discrete current amount.

20. The system of claim 11, further comprising communication circuitry communicatively coupled to the inverter controller and configured to communicate with remote devices.

* * * * *